United States Patent (12)
Duong et al.

(10) Patent No.: US 8,688,544 B2
(45) Date of Patent: Apr. 1, 2014

(54) ANALYZING MARKETPLACE LISTING STRATEGIES (75) Inventors: Quang Anh Duong, Ann Arbor, MI (US); Neelakantan Sundaresan, Mountain View, CA (US); Nishith Parikh, Fremont, CA (US); Zeqian Shen, San Jose, CA (US)

(73) Assignee: eBay Inc., San Jose, CA (US)

( * ) Notice: Subject to any disclaimer, the term of this patent is extended or adjusted under 35 U.S.C. 154(b) by 112 days.

(21) Appl. No.: 13/072,598

(22) Filed: Mar. 25, 2011

(65) Prior Publication Data

US 2011/0238455 A1 Sep. 29, 2011

Related U.S. Application Data (60) Provisional application No. 61/318,219, filed on Mar. 26, 2010.

(51) Int. Cl.
*G06Q 30/00* (2012.01)
(52) U.S. Cl.
USPC .................. 705/26.7; 705/26.1; 705/27.1
(58) Field of Classification Search
USPC .................. 705/26.1, 27.1, 26.7
See application file for complete search history.

(56) References Cited

U.S. PATENT DOCUMENTS

| 6,782,370 | B1 * | 8/2004 | Stack | 705/7.29 |
|---|---|---|---|---|
| 7,676,400 | B1 * | 3/2010 | Dillon | 705/26.7 |
| 7,983,952 | B1 * | 7/2011 | Dillon | 705/26.7 |
| 8,249,916 | B2 * | 8/2012 | Gworek | 705/7.35 |
| 2007/0192166 | A1 * | 8/2007 | Van Luchene | 705/10 |

OTHER PUBLICATIONS

"A nearly perfect market? Differentiation vs. price in consumer choice" (Brynjolfsson, Erik; Dick, Astrid; Smith, Michael. Quant Mark Econ (2010) 8:1-33. Published online Nov. 5, 2009, Accepted Sep. 30, 2009).*

* cited by examiner

*Primary Examiner* — Courtney Stopp
(74) *Attorney, Agent, or Firm* — Schwegman, Lundberg & Woessner, P.A.

(57) ABSTRACT

A method and system analyze marketplace listing strategies. In some embodiments, the method accesses data associated with multiple marketplace listings. Each marketplace listing is associated with a product category. A state-action model, associated with the product category, is created based on the data associated with the multiple marketplace listings. The state-action model is then analyzed to identify a marketplace listing strategy associated with the product category.

15 Claims, 9 Drawing Sheets

ANALYZING MARKETPLACE LISTING STRATEGIES

RELATED APPLICATION

This application claims the benefit of U.S. Provisional Application Ser. No. 61/318,219, entitled "MODELING SELLER LISTING STRATEGIES", filed Mar. 26, 2010, the disclosure of which is incorporated herein by reference in its entirety.

TECHNICAL FIELD

The present disclosure generally relates to data processing techniques and, more specifically, to methods and systems for analyzing marketplace listing strategies.

BACKGROUND

Advancements in computer and networking technology have enabled users and entities to conduct various types of transactions online via computer-based applications and systems. These advancements have caused the growth of electronic commerce, commonly referred to as "ecommerce", and the development of ecommerce marketplaces that allow multiple users and entities to shop and execute various online transactions.

Many ecommerce marketplaces support the buying and selling of large numbers of items and services. In particular ecommerce marketplaces, sellers may use different pricing strategies, shipping options, and other marketplace listing techniques when presenting items and services for sale. Although multiple sellers may offer the same item in the same ecommerce marketplace, the sellers may experience different sales success based on the listing techniques used when presenting the item in the marketplace.

BRIEF DESCRIPTION OF THE DRAWINGS

Some embodiments are illustrated by way of example and not limitation in the figures of the accompanying drawings.

DETAILED DESCRIPTION

Example methods and systems to analyze marketplace listing strategies are described. In the following description, for purposes of explanation, numerous specific details are set forth in order to provide a thorough understanding of example embodiments. It will be evident, however, to one skilled in the art that the present invention may be practiced without these specific details.

The methods and systems described herein identify and analyze marketplace listing information associated with one or more users (e.g., marketplace sellers). The results of the analysis are used to generate one or more recommendations regarding marketplace listings for other users. These recommendations may include adjusting a price of a product in a listing, adjusting shipping costs (e.g., offering free shipping), and adding the listing as a featured selection. The described systems and methods may consider historical data associated with one or more users as well as current data (e.g., current marketplace listings).

The methods and systems further allow other users to learn from successful sellers in a common marketplace. This information is beneficial to other users who are not experiencing success in selling items in the marketplace by allowing them to identify listing strategies of more experienced sellers who are listing the same or similar items.

As used herein, a "user" or an "entity" may be a person (e.g., a human), a business (e.g., a company), an organization, a group of people, a persona (e.g., a fictitious character), or any combination thereof. Further, as used herein, a "marketplace listing strategy" is any technique, procedure, or action used in selling or offering products, services or other items in a marketplace. A marketplace listing strategy may also be referred to as a "product listing strategy" or "listing strategy". Example marketplace listing strategies include lowering the listing price after a time period if the item has not sold, offering free shipping on items in certain price ranges, and so forth. Although particular examples discussed herein refer to "products", the teachings of the present invention are applicable to any type of marketplace listing for any product, service, item, and the like.

Figure 1:
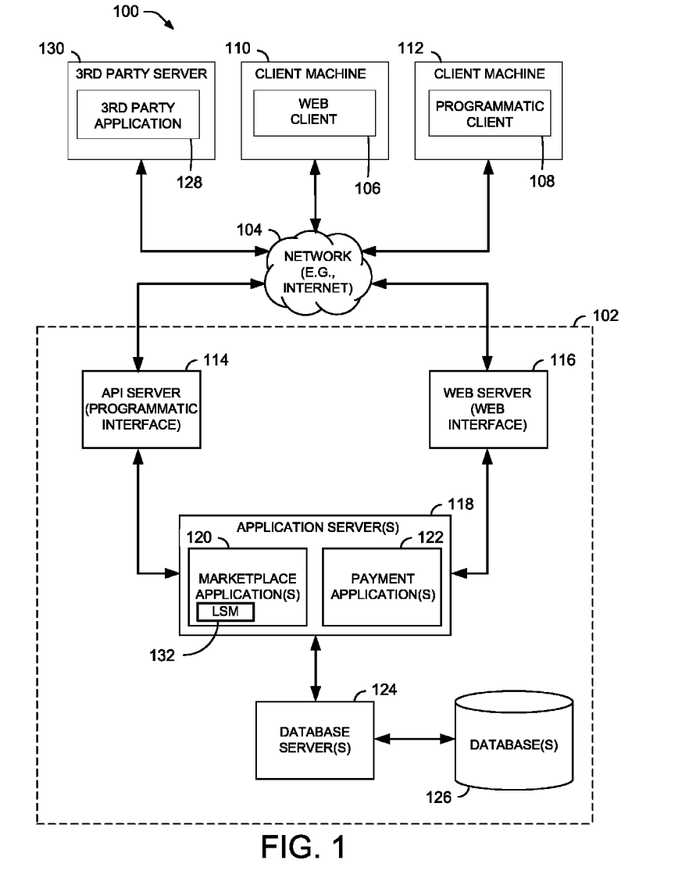
FIG. 1 is a network diagram depicting a client-server system within which an example embodiment may be deployed.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or Wide Area Network (WAN)) to one Or more clients. FIG. 1 illustrates, for example, a web client 106 (e.g., a browser, such as the Internet Explorer browser developed by Microsoft Corporation of Redmond, Wash. State), and a programmatic client 108 executing on respective client machines 110 and 112.

An Application Programming Interface (API) server 114 and a web server 116 are coupled to, and provide programmatic and web interfaces respectively to, one or more application servers 118. Application servers 118 host one or more marketplace applications 120 and payment applications 122. Application servers 118 are, in turn, shown to be coupled to one or more database servers 124 that facilitate access to one or more databases 126.

Marketplace applications 120 may provide a number of marketplace functions and services to users that access networked system 102. Payment applications 122 may likewise provide a number of payment services and functions to users. Payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of networked system 102, it will be appreciated that, in alternative embodiments, payment applications 122 may form part of a payment service that is separate and distinct from networked system 102.

Further, while the system 100 shown in FIG. 1 employs a client-server architecture, the present invention is of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

Web client 106 accesses the various marketplace and payment applications 120 and 122 via the web interface supported by web server 116. Similarly, programmatic client 108 accesses the various services and functions provided by the marketplace and payment applications 120 and 122 via the programmatic interface provided by API server 114. Programmatic client 108 may, for example, be a seller application (e.g., the TurboLister application developed by eBay Inc., of San Jose, Calif.) to enable sellers to author and manage listings on networked system 102 in an off-line manner, and to perform batch-mode communications between programmatic client 108 and networked system 102. Some embodiments of the present invention may be implemented by components of the marketplace application(s) 120. For example, a listing strategy module 132 or other system performs the analysis of marketplace listing strategies described herein.

FIG. 1 also illustrates a third party application 128, executing on a third party server machine 130, as having programmatic access to networked system 102 via the programmatic interface provided by API server 114. For example, third party application 128 may, utilizing information retrieved from networked system 102, support one or more features or functions on a website hosted by the third party. The third party website may, for example, provide one or more promotional, marketplace or payment functions that are supported by the relevant applications of the networked system 102.

Figure 2:
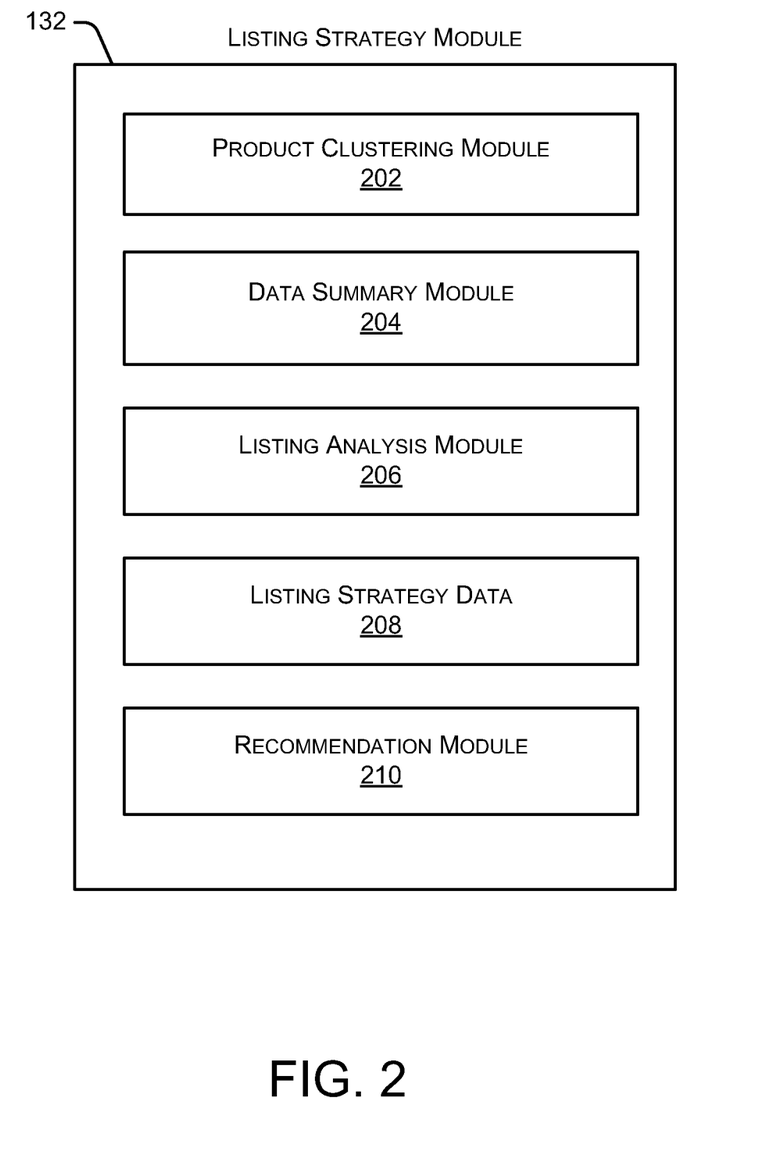
FIG. 2 is a block diagram of a listing strategy module, in accordance with some embodiments of the present invention.

FIG. 2 is a block diagram of a listing strategy module 132, in accordance with some embodiments of the present invention. Listing strategy module 132 may be executed or included in, for example, an application server 118 shown in FIG. 1. In various embodiments, listing strategy module 132 implements computer programs, logic, applications, methods, processes, or software to analyze marketplace listing strategies.

In the embodiment of FIG. 2, listing strategy module 132 includes a product clustering module 202, a data summary module 204, a listing analysis module 206, listing strategy data 208, and a recommendation module 210. Product clustering module 202 is configured to cluster various products contained in multiple marketplace listings into common groupings. As discussed in greater detail below, this clustering of products is performed in particular embodiments by making reference to one or more product catalogs. Data summary module 204 is configured to summarize multiple sets of listing information that were grouped together by product clustering module 202. Listing analysis module 206 is configured to analyze the summarized listings to identify listing strategies used by one or more sellers in the marketplace. Listing strategy data 208 represents the listing strategies identified, for example, by listing analysis module 206. Recommendation module 210 is configured to make recommendations regarding marketplace listing parameters based on listing strategy data 208.

In alternate embodiments, listing strategy module 132 may include fewer or more modules apart from those shown in FIG. 1. For example, in one alternate embodiment, data summary module 204 is integrated within product clustering module 202. Product clustering module 202, data summary module 204, listing analysis module 206, and recommendation module 210 may be in the form of software that is processed by a processor. In another example, as described herein, modules 202, 204, 206, and 210 may be in the form of firmware that is processed by application specific integrated circuits (ASICs); which may be integrated into a circuit board. Alternatively, modules 202, 204, 206, and 210 may be in the form of one or more logic blocks included in a programmable logic device (e.g., a field programmable gate array (FPGA)). The described modules 202, 204, 206, and 210 may be adapted, and/or additional structures may be used to provide alternative or additional functionalities beyond those specifically discussed with reference to FIG. 2.

Figure 3:
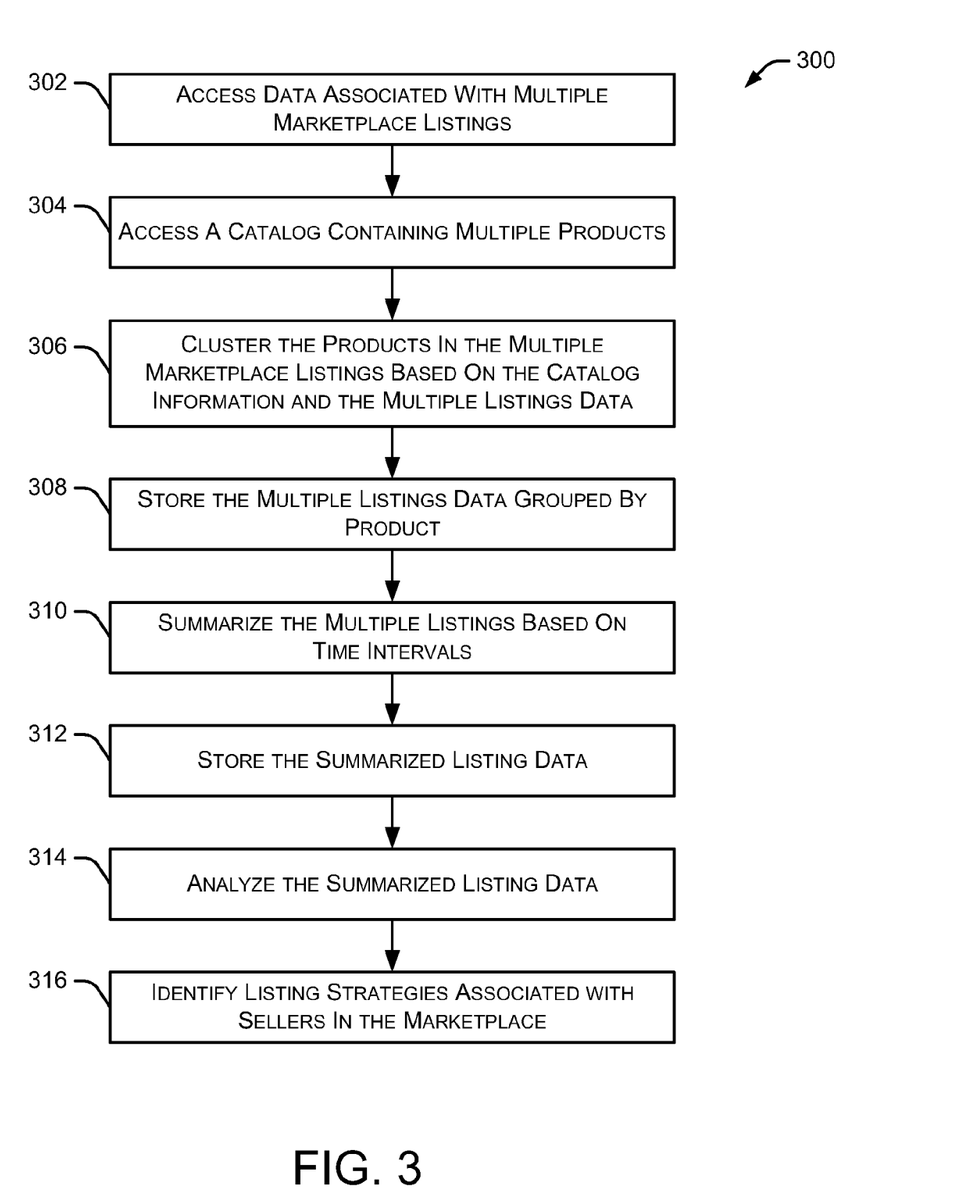
FIG. 3 is a flow diagram of a method, in accordance with an embodiment, for analyzing marketplace listing strategies.

FIG. 3 is a flow diagram of a method 300, in accordance with an embodiment, for analyzing marketplace listing strategies. In a particular embodiment, method 300 is implemented by a processor or computing system, such as one or more of the processors and computing systems discussed herein with respect to FIGS. 1 and 9. In some embodiments, method 300 is implemented by listing strategy module 132. Initially, method 300 accesses data associated with multiple marketplace listings at 302. The marketplace listings may be associated with a single marketplace or associated with multiple different marketplaces. A "marketplace listing" refers to any product, service or other offering presented by a user or entity (e.g., a seller). Example data associated with a marketplace listing includes seller identification, product identification, listing start date, listing end date, price, title, shipping (or delivery) cost, and whether the listing was a "featured listing". The marketplace listings may include active listings as well as completed listings (e.g., completed marketplace transactions). Thus, the data associated with the multiple marketplace listings may include both active listings as well as historical listing information.

After accessing the listing data, method 300 accesses a catalog containing multiple products at 304. The catalog includes, for example, data associated with any number of different types of products. This data may include product descriptions, product features, product specifications, and so forth. In a particular implementation, method 300 accesses multiple catalogs to obtain data associated with multiple different products. Example catalogs may be obtained from a product manufacturer, product distributor or a third party entity. Alternatively, one or more catalogs may be created by an entity associated with the marketplace.

Multiple users can create product listings for the same product but describe the product in different ways, such as using different words in the listing or describing different characteristics of the product. Thus, it is desirable to group (or cluster) together multiple listings that identify the same product. Method 300 clusters the products in the multiple marketplace listings based on information accessed from the catalog and data associated with the multiple listings at 306. Thus, if two different listings for the same product have different descriptions, they will be grouped together for purposes of analysis. Additional details regarding this clustering process are discussed below with respect to FIG. 4.

After the multiple listings are grouped together based on a common product, data associated with the group of listings is stored at 308. This stored data supports future analysis of the multiple listings, such as analysis of seller listing strategies for a particular product.

New marketplace listings are typically added on a regular basis. Thus, the data associated with current and historical listings continues to grow as new listings are added by users. Further, different users may adjust their product listing strategies at different time frequencies. For example, users may update listing strategies on a daily, weekly, or monthly basis. To simplify the processing of the stored listing data associated with a particular product, the multiple listings are summarized based on a specific time interval at 310. In one embodiment, the multiple listings are summarized based on a calendar week. The summarized listing data is stored at 312 for future analysis. Additional details regarding this summarization of multiple listings are discussed below with respect to FIG. 5.

After storing the summarized listing data, method 300 analyzes the summarized listing data at 314. This analysis identifies marketplace listing strategies at 316 used by one or more sellers in the marketplace. In a particular implementation, this analysis is focused on sellers with successful selling results in the marketplace, such that the analysis identifies successful marketplace listing strategies in the particular marketplace. These successful marketplace listing strategies may be useful in improving the sales of products by other sellers in the marketplace. For example, if a successful seller in a particular product category regularly uses the listing strategy of offering free shipping, the system may recommend that other sellers in the same product category offer free shipping to improve their sales activity.

Figure 4:
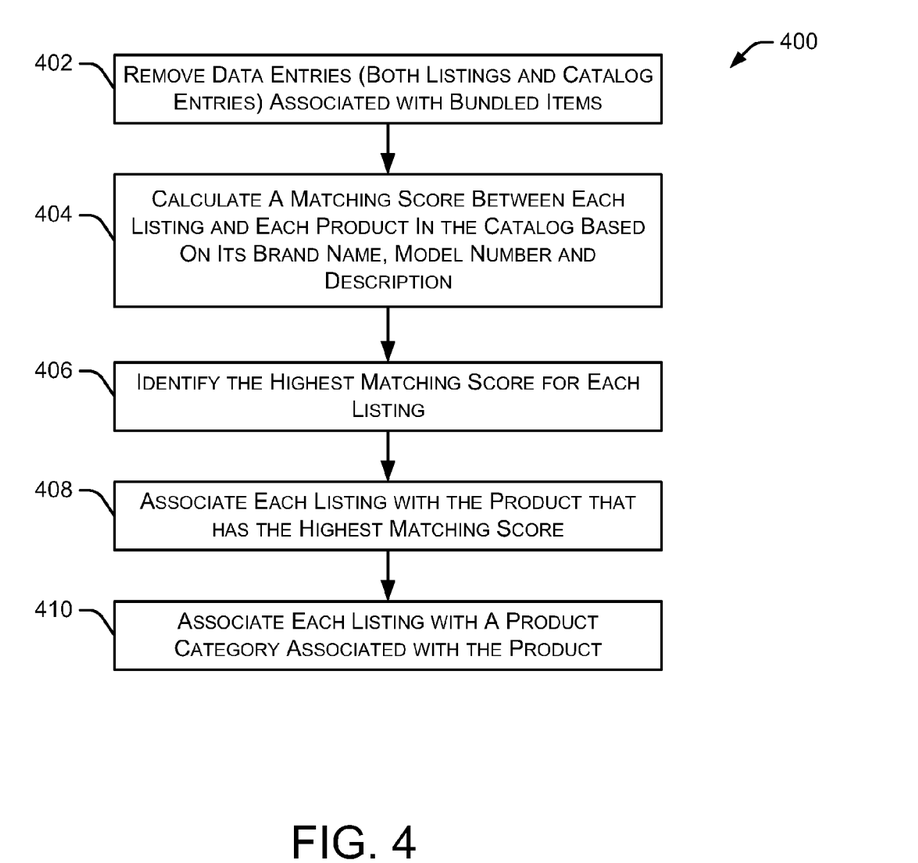
FIG. 4 is a flow diagram of a method, in accordance with an embodiment, for clustering marketplace listing data.

FIG. 4 is a flow diagram of a method 400, in accordance with an embodiment, for clustering marketplace listing data. As discussed above with respect to FIG. 3 (at 306), different users can describe the same product in different ways. To properly analyze multiple product listings associated with the same product, it is important to first cluster the multiple listings based on the product associated with each listing. Method 400 performs this clustering process by analyzing the marketplace listing data and the catalog data discussed above with respect to method 300.

Initially, method 400 removes data entries associated with bundled items at 402. "Bundled items" refers to the bundling or packaging of multiple products and/or services into a single marketplace listing (e.g., bundling a cellular phone with a carrying case). Since the bundled items do not contain a single product, their listing strategies may differ from those of individual products. For example, a seller of a carrying case alone may use a different listing strategy than a cellular phone bundled with a carrying case. The bundled items are removed from both the marketplace listing data and the catalog data at 402. Table 1 below identifies example marketplace listing data after removal of bundled items. Table 1 is limited to three marketplace listings for purposes of discussion. Actual marketplace listing data may include any number of entries.

TABLE 1

| Seller ID | Prod ID | Start Date | End Date | Price | Title | Ship. | Feat. Lst? |
|---|---|---|---|---|---|---|---|
| ABC | 111 | Mar. 20, 2009 | Mar. 27, 2009 | 100.00 | Silver Acme DE-9 Player | 7.50 | No |
| ABC | 222 | Mar. 21, 2009 | Mar. 29, 2009 | 150.00 | DE-9 Acme Player NEW | 0.00 | No |
| DEF | 333 | Mar. 20, 2009 | Mar. 29, 2009 | 150.00 | DE-9 Acme NEW Red | 0.00 | Yes |

As shown in Table 1, each listing includes a seller identification, a product identification, a listing start date, a listing end date, a price, a listing title, a shipping cost, and an indication of whether the listing was a "featured listing". In this example, two of the listings are associated with seller ABC, and one listing is associated with setter DEF. Although the three listings have different titles, they are all associated with the same product (an "Acme DE-9 Player"). The three listings in Table 1 have different combinations of start dates, end dates, price, and shipping cost.

Method 400 continues by calculating a matching score between each of the multiple marketplace listings and each product in the catalog at 404 based on various factors such as brand name, model number, and description. Additionally, the matching score may include the number of matched words between the catalog description and the listing title. For example, the matching score may be calculated using a word similarity algorithm. In one embodiment, a Jaccard similarity coefficient (also referred to as a Jaccard Index) provides a ratio of the number of common words between the catalog description and the listing title to the total distinct words found in the catalog description and the listing title.

The highest matching score between each marketplace listing and a product in the catalog is identified at 406. Based on this highest matching score, each marketplace listing is associated with the product having the highest matching score at 408. Thus, multiple marketplace listings that use different product descriptions will be associated with the same product based on the matching with a common catalog. As discussed above with respect to FIG. 3, the resulting association between each marketplace listing and a particular product is stored for later analysis.

In a particular embodiment, each marketplace listing is further associated with a product category at 410. This product category is determined based on the product associated with the listing. For example, if the product is an Acme DE-9 Player, the product category is "Portable Media Player". A product category can have any number of associated products from different manufacturers. Associating marketplace listings with a product category simplifies the analysis of seller listing strategies. Instead of analyzing seller listing strategies associated with each model of portable media player, all listings for this product category are analyzed together. Thus, the seller listing strategies are based on (and applicable to) a large number of products in the product category. In this embodiment, all three listings in Table 1 are associated with the same product category (portable media players) although their descriptions and titles are different.

In alternate embodiments, seller listing strategies may be analyzed on a per-product basis. In this embodiment, different listing strategies may be identified for specific products. For example, a particular model of cellular phone may have a different listing strategy than another model of cellular phone. This embodiment typically requires a larger amount of transactional data to develop a relevant amount of data for each product being analyzed.

Figure 5:
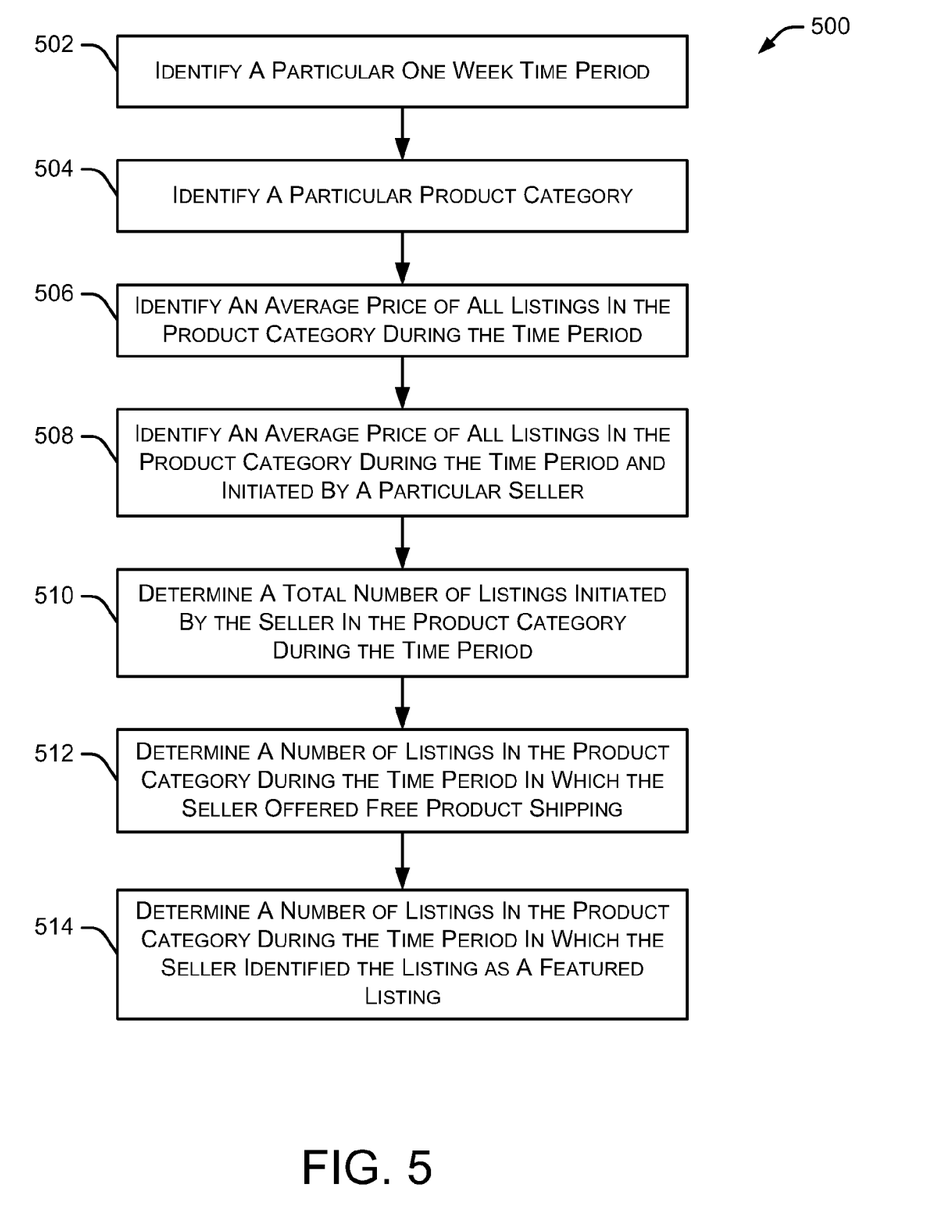
FIG. 5 is a flow diagram of a method, in accordance with an embodiment, for summarizing multiple marketplace listings.

FIG. 5 is a flow diagram of a method 500, in accordance with an embodiment, for summarizing multiple marketplace listings. As discussed above with respect to FIG. 3 (at 310), marketplace listing data is summarized based on a specific time interval. In one embodiment, the marketplace listing data is summarized based on a calendar week. Method 500 performs this summarizing process by first identifying a particular one week time period at 502. The time period may be identified by a user or defined as the immediately preceding calendar week. A particular product category is also identified at 504. In this embodiment of method 500, the listings are summarized based on an associated product category, such as a listing category or subcategory in the marketplace. In alternate embodiments, similar procedures are used to summarize the listings based on individual products.

The method continues by identifying an average price of all listings in the product category during the time period at 506. In the example of Table 1, the average price of all listings in the product category is 133.33 ((100+150+150)/3). At 508, method 500 identifies an average price of all listings in the product category during the time period and that are initiated by a particular seller. In the example of Table 1, the average price of all listings initiated by seller "ABC" is 125.00 ((100+150)/2). A total number of listings initiated by the seller in the product category during the time period is determined at 510. Table 1 shows two listings initiated by seller "ABC".

Method 500 continues by determining at 512 a number of listings in the product category during the time period in which the seller offered free product shipping. In the example of Table 1, 50% of the listings initiated by seller "ABC" offered free product shipping. In alternate embodiments, the method may determine an average shipping cost charged by the seller for all listings instead of the percentage of listings with free shipping. At 514, the method determines a number of listings in the product category and during the time period in which the seller identified the listing as a featured listing. In the example of Table 1, none of the listings initiated by seller "ABC" were featured listings. As discussed below, the information identified and calculated in FIG. 5 is analyzed to identify seller listing strategies associated with one or more product categories.

Table 1 and the descriptions herein identify and calculate particular types of data used in analyzing seller listing strategies. Alternate embodiments may identify and calculate fewer types of data than those discussed herein. Other embodiments may identify and calculate additional types of data, such as the day of the week the listing was initiated, whether the listing was a fixed price listing or an auction style listing, whether the listing offered a "buy it now" feature, types of payment methods accepted, shipping options (e.g., carriers), whether local pick-up of the item is available, the category (or categories) in which the listing was identified, and, if the listing was an auction, whether the listing had a specified reserve price.

Figure 6:
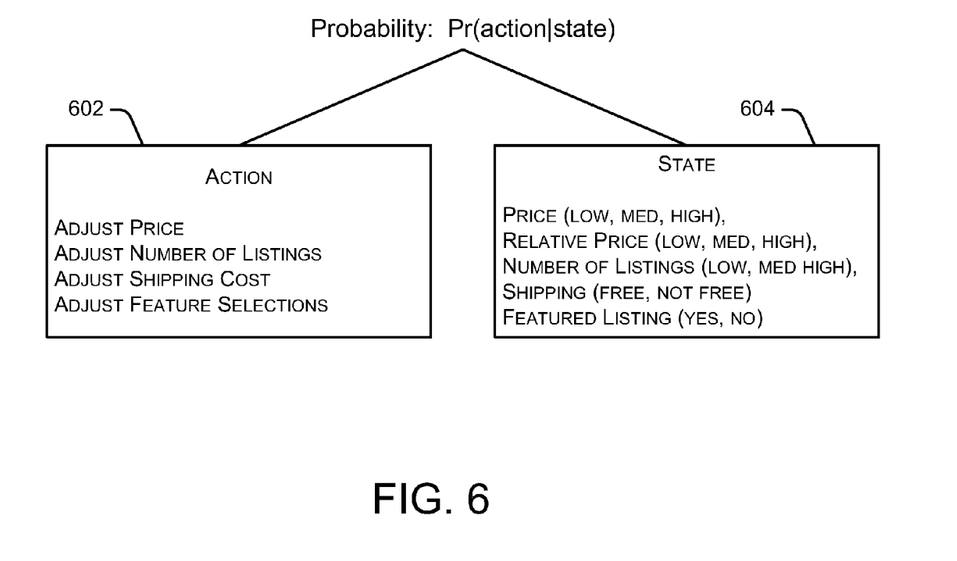
FIG. 6 depicts, in accordance with an embodiment, available components in a state-action model.

FIG. 6 depicts, in accordance with an embodiment, available components in a state-action model. The available components include multiple actions 602 and multiple states 604. The state-action model, discussed in greater detail below, represents probabilities associated with various marketplace listing actions. As shown in FIG. 6, the possible actions 602 associated with a marketplace listing include adjusting a listing price, adjusting a number of listings for a particular seller, adjusting a shipping cost (e.g., changing to free shipping), and adjusting feature selections (e.g., changing a listing to a featured listing). The possible states 604 associated with the state-action model include a listing price, a relative price (e.g., relative to the average listing price for all listings), a number of listings, a shipping cost, and a featured listing status. The price, relative price, and number of listings states can have values of low, medium or high. The shipping state can have values of free or not free, and the featured listing state can have values of yes or no.

As used herein, a "state-action model" may also be referred to as a "marketplace listing model" or a "listing strategy model".

In one embodiment, a predictive Markov chain models seller listing behaviors using the information identified and calculated from various data sources as discussed above with respect to FIG. 5. A Markov chain model is defined by a set of states and a set of transitions having associated probabilities. The combination of states and transitions between those states generates a sequence (e.g., a chain). The Markov chain model helps determine whether successful sellers use consistent strategies when listing their products in the marketplace. If the successful sellers do use consistent listing strategies, the Markov chain models can assist in predicting their listing decisions.

Figure 7:
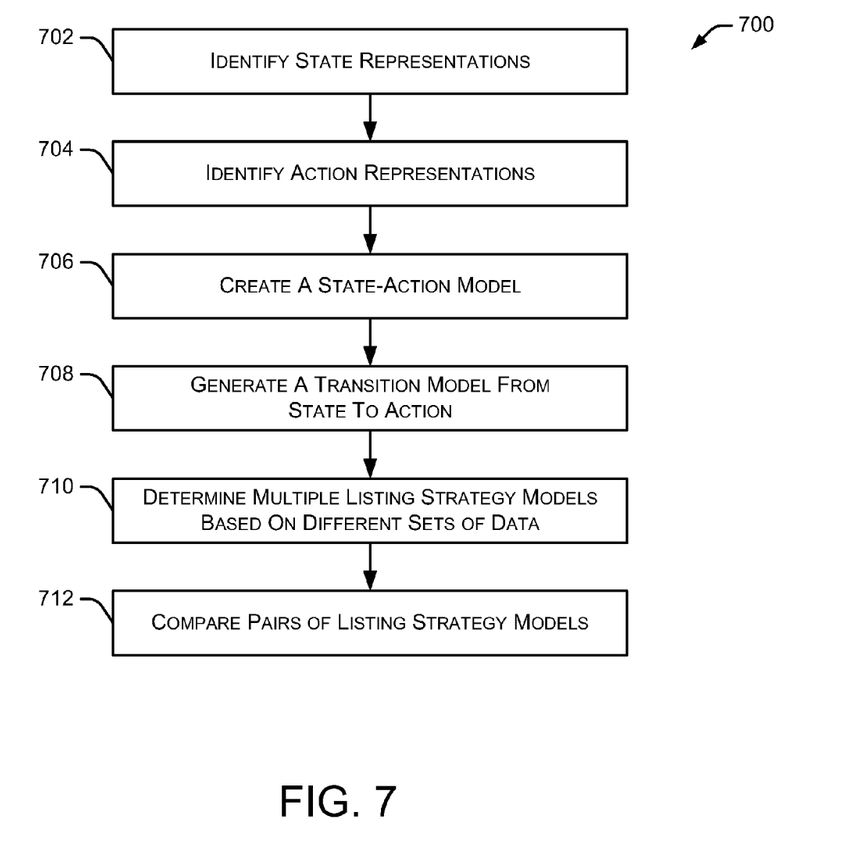
FIG. 7 is a flow diagram of a method, in accordance with an embodiment, for analyzing the summarized marketplace listings.

FIG. 7 is a flow diagram of a method 700, in accordance with an embodiment, for analyzing the summarized marketplace listings. In a particular embodiment, for each pair of seller and product category, a corresponding Markov chain model is constructed that is related to the seller's listing strategies for the product category. The Markov chain model is an example of the state-action model discussed herein. At various times, the seller performs an action that transitions its current state to another state.

Method 700 begins by identifying state representations at 702. Example states and their corresponding values are shown in FIG. 6. Each state of the model contains information about the marketplace condition and a seller's new listings created in a time interval. The method further identifies action representations at 704. An action by a particular seller at a specific time represents a listing change (e.g., price change or shipping cost change) as compared to the listing details prior to the specific time.

Method 700 continues by creating a state-action model at 706, such as a Markov chain model. In a traditional implementation, the Markov chain model does not consider past actions when transitioning from a current state to a different state. However, marketplace sellers may review the effectiveness of past actions when considering a change to a current marketplace listing. Thus, a particular embodiment of the state-action model discussed herein extends the model's state representation to include currently available information as well as the seller's last action.

After creating the state-action model, the method generates a transition model from state to action at 708, also referred to as a "state-action transition model". To identify seller listing strategies, the transition model focuses on the action taken from a particular state, rather than focusing on the resulting state. The action taken in response to a particular state is valuable in determining the seller's strategy. The state-action transition model identifies a probability associated with each of the possible actions a seller may take in a particular state. This probability is referred to as "Pr(action|state)". A particular transition from a state to an action identifies the probability of the particular transition as well as the number of times the seller has selected the particular transition from the current state.

Figure 8:
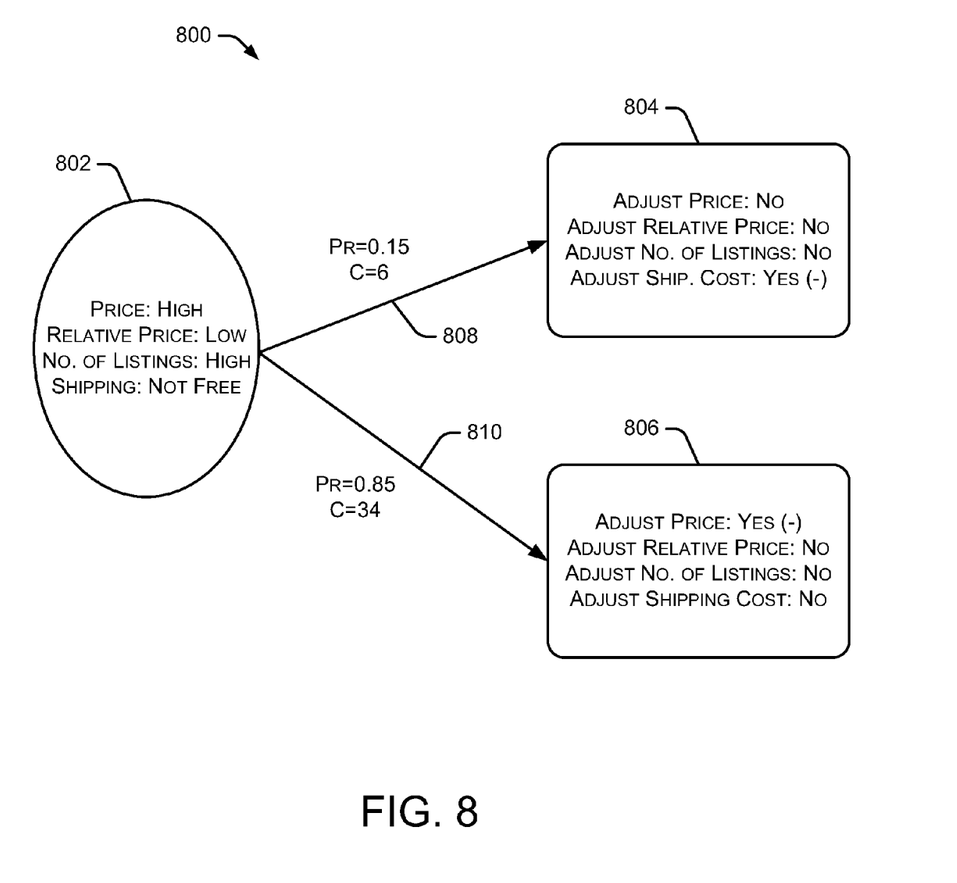
FIG. 8 is a transition model, in accordance with an embodiment, showing possible transitions available from a current state.

FIG. 8 is a transition model 800, in accordance with an embodiment, showing possible transitions available from a current state 802. In the example of FIG. 8, the seller has previously taken one of two actions (804 and 806) from the current state 802. Action 804 adjusts the shipping cost by lowering the cost or offering free shipping for the listing. Action 806 adjusts the listing price by lowering the price. In the example of FIG. 8, the data being analyzed identifies 40 (i.e., 6+34) transition actions previously taken by the seller. A transition line 808 indicates that the likelihood of taking action 804 is 15% (i.e., c/40=6/40=15%). Another transition line 810 indicates that the likelihood of taking action 806 is 85% (i.e., c/40=34/40=85%). Thus, in the 40 previous situations in which the seller was at state 802 for the current product category, 15% of the time the seller reduced the shipping cost and 85% of the time the seller reduced the listing price. These percentages are predictors of the seller's strategy and the seller's likely decision at a similar state in the future.

Referring back to FIG. 7, the method continues by determining multiple listing strategy models based on different sets of data at 710. Each set of data is clustered and summarized as described above with respect to FIG. 3. For each set of data, a corresponding state and action are determined as discussed herein. To evaluate the predictive value of the listing strategy models, the method compares pairs of listing strategy models at 712. In one embodiment, evaluating the predictive value of the listing strategy model includes computing a log likelihood of the data (D) with the model (M). The computation of the log likelihood (L) is as follows:

$$L(M) = \text{avg}(\log(Pr(\text{action}|\text{state})))$$

Where avg is the average value of the log of each probability.

Two different listing strategy models (M1 and M2) derived from two different data sets (D1 and D2) can be compared using the following equation:

$$L(M1, M2) = L(M1)/L(M2)$$

Where a L(M1, M2) value less than one means that M1 is a better model at predicting listing strategies than M2. If the L(M1, M2) value is greater than one, then M2 is a better model at predicting listing strategies than M1.

Additionally, when comparing listing strategy models M1 and M2, the method can determine how much better at prediction one model (M1) is compared to another model (M2) by calculating:

$$\text{Predictor quality} = 1 - L(M1, M2).$$

Method 700 represents one approach for analyzing the summarized marketplace listings. Alternate embodiments may use different techniques to analyze marketplace listing strategies associated with one or more sellers.

After identifying a listing strategy model that result in desirable sales activity, that model may be applied to other listings and other sellers in the marketplace. For example, a successful listing strategy model for a particular product category can generate listing adjustment recommendations for other entities or users offering products in the same product category.

Figure 9:
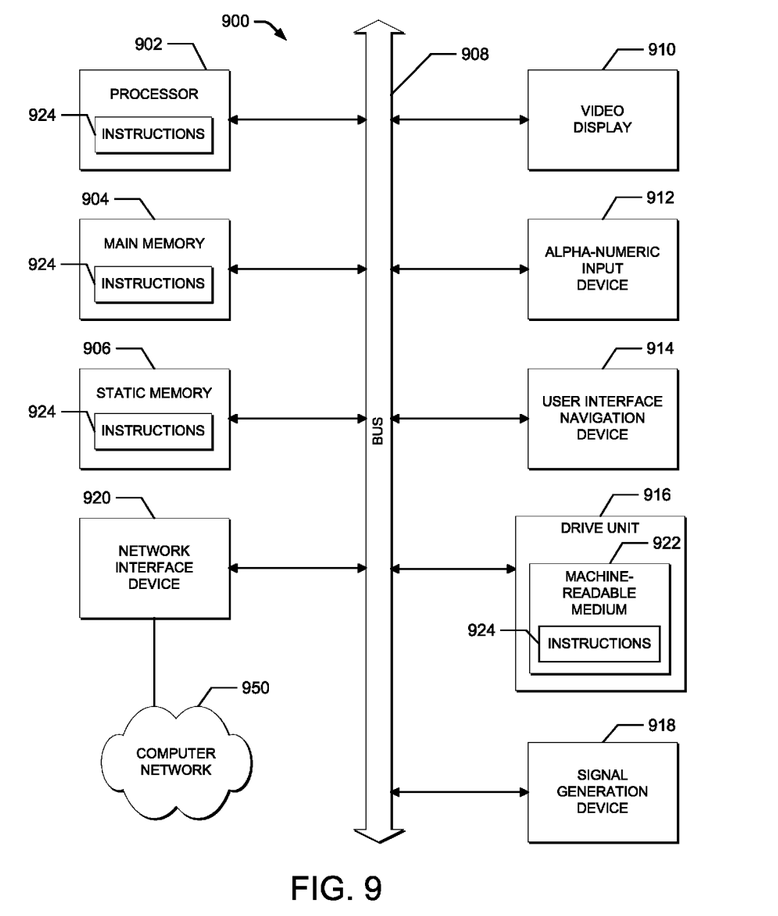
FIG. 9 is a block diagram of a machine in the example form of a computer system within which a set of instructions, for causing the machine to perform any one or more of the methodologies discussed herein, may be executed.

FIG. 9 shows a diagrammatic representation of machine in the example form of a computer system 900 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU) a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a cursor control device 914 (e.g., a mouse), a disk drive unit 916, a signal generation device 918 (e.g., a speaker) and a network interface device 920.

The disk drive unit 916 includes a machine-readable storage medium 922 on which is stored one or more sets of instructions (e.g., software 924) embodying any one or more of the methodologies or functions described herein. The software 924 may also reside, completely or at least partially, within the main memory 904, within the static memory 906, and/or within the processor 902 during execution thereof by the computer system 900, the main memory 904 and the processor 902 also constituting machine-readable media. The software 924 may further be transmitted or received over a network 926 via the network interface device 920.

While the machine-readable storage medium 922 is shown in an example embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing, encoding or carrying a set of instructions for execution by the machine and that cause the machine to perform any one or more of the methodologies of the present invention. The term "machine-readable storage medium" shall accordingly be taken to include, but not be limited to, solid-state memories, optical and magnetic media, and carrier wave signals.

Thus, a method and system for analyzing marketplace listing strategies have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

In the foregoing description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the description, with each claim standing on its own as a separate embodiment.

What is claimed is:

1. A method comprising:
   accessing data associated with a plurality of marketplace listings;
   grouping each marketplace listing of the plurality of marketplace listings into a product category;
   creating a state-action model based on the data associated with the plurality of marketplace listings, the state action model representing probabilities of actions associated with the plurality of marketplace listings grouped in the product category, the creating of the state-action model being performed by a processor of a machine; and
   analyzing the state-action model to identify a marketplace listing strategy associated with the product category based on the probabilities of actions associated with the plurality of marketplace listings grouped in the product category.

2. The method of claim 1, further comprising accessing a catalog containing data associated with a plurality of products.

3. The method of claim 2, wherein creating the state-action model is further based on data in the catalog.

4. The method of claim 2, wherein associating each marketplace listing with a product category is based on the marketplace listing data and the catalog data.

5. The method of claim 1, further comprising summarizing the plurality of marketplace listings prior to creating a state-action model.

6. The method of claim 1, wherein the state-action model includes a plurality of possible actions associated with each state.

7. The method of claim 6, wherein the plurality of possible actions associated with each state include at least one of a price adjustment, a shipping cost adjustment, a featured listing adjustment, and a number of marketplace listings adjustment.

8. The method of claim 6, wherein each of the plurality of possible actions has an associated probability for the action to occur.

9. The method of claim 1, further comprising applying the marketplace listing strategy to another marketplace listing not contained in the plurality of marketplace listings.

10. The method of claim 1, further comprising creating a second state-action model based on the data associated with the plurality of marketplace listings, the state-action model associated with a second product category.

11. The method of claim 1, wherein the state-action model is further associated with an initiator of at least a portion of the plurality of marketplace listings.

12. The method of claim 1, wherein at least a portion of the plurality of marketplace listings are completed marketplace transactions.

13. A non-transitory machine-readable storage medium comprising instructions that, when executed by one or more processors of a machine, cause the machine to perform operations comprising:
   accessing data associated with a plurality of marketplace listings;
   accessing a catalog containing product category data;
   grouping each marketplace listing of the plurality of marketplace listings into a product category based on the product category data and the data associated with the plurality of marketplace listings;
   creating a state-action model based on the data associated with the plurality of marketplace listings, the state action model representing probabilities of actions associated with the plurality of marketplace listings grouped in the product category; and
   analyzing the state-action model to identify a marketplace listing strategy associated with the product category based on the probabilities of actions associated with the plurality of marketplace listings grouped in the product category.

14. The non-transitory machine-readable storage medium of claim 13, wherein the marketplace listing strategy is further associated with an initiator of at least a portion of the plurality of marketplace listings.

15. The non-transitory machine-readable storage medium of claim 13, wherein the state-action model includes a plurality of possible states and a plurality of possible actions associated with each state, and wherein each of the plurality of possible actions has an associated probability for the action to occur.

* * * * *